(12) United States Patent
Graf et al.

(10) Patent No.: US 7,837,119 B2
(45) Date of Patent: Nov. 23, 2010

(54) CONTACTLESS DATA CARRIER

(75) Inventors: Hans Graf, Rosenheim (DE); Klaus Finkenzeller, Unterföhring (DE); Alfred Rossmadl, Boos (DE)

(73) Assignee: Giesecke & Devrient GmbH, Munich (DE)

( * ) Notice: Subject to any disclaimer, the term of this patent is extended or adjusted under 35 U.S.C. 154(b) by 1075 days.

(21) Appl. No.: 10/552,626

(22) PCT Filed: Apr. 13, 2004

(86) PCT No.: PCT/EP2004/003880

§ 371 (c)(1),
(2), (4) Date: Sep. 12, 2006

(87) PCT Pub. No.: WO2004/090800

PCT Pub. Date: Oct. 21, 2004

(65) Prior Publication Data

US 2007/0063055 A1    Mar. 22, 2007

(30) Foreign Application Priority Data

Apr. 14, 2003   (DE) ............................... 103 17 257

(51) Int. Cl.
*G06K 19/06*   (2006.01)

(52) U.S. Cl. ...................................................... 235/492
(58) Field of Classification Search ................. 235/492, 235/440, 454
See application file for complete search history.

(56) References Cited

U.S. PATENT DOCUMENTS

| 5,347,110 | A |   | 9/1994  | Audebert et al. |
|-----------|---|---|---------|-----------------|
| 5,590,038 | A | * | 12/1996 | Pitroda ........................ 705/41 |
| 5,729,717 | A | * | 3/1998  | Tamada et al. ............... 711/164 |
| 5,789,733 | A |   | 8/1998  | Jachimowicz et al. |
| 5,825,045 | A |   | 10/1998 | Koenck et al. |
| 5,874,724 | A | * | 2/1999  | Cato .......................... 235/492 |
| 2003/0052159 | A1 |  | 3/2003 | Kawan |
| 2003/0057276 | A1 |  | 3/2003 | Appalucci et al. |
| 2005/0184150 | A1 | * | 8/2005 | Welte et al. .................. 235/385 |

FOREIGN PATENT DOCUMENTS

FR       2 770 316       4/1999

* cited by examiner

*Primary Examiner*—Daniel A Hess
(74) *Attorney, Agent, or Firm*—Bacon & Thomas, PLLC

(57) ABSTRACT

The invention relates to an apparatus as well as a method for reliably determining the deliberate use of a contactless data carrier. Beside an antenna-based data transmission channel in dependence on the data to be transmitted additionally an optical data transmission channel between reading device and data carrier can be employed.

30 Claims, 4 Drawing Sheets

CONTACTLESS DATA CARRIER

BACKGROUND OF THE INVENTION

A. Field

The present invention relates to an apparatus as well as a method for reliably determining the deliberate use of a contactless data carrier.

B. Related Technology

The term "contactless data carrier" or "contactless card" used in the following refers to all arrangements, which have a microchip and an antenna connected to it and are adapted to exchange data with a suitable reading device. These include, beside chip cards for payment applications, contactlessly readable identification documents, such as passports and identity cards with built-in microchip as well as, furthermore, RFID labels.

Contactless data carriers for payment transactions today are exclusively used in closed applications, such as for instance for paying in the canteen or in public transport. The reason for this is that in Germany contactless cards are still not permitted for payment applications, as e.g. in the form of a cash card, which is due to security reasons. The decisive factor for this is the fear that third persons may contactlessly discharge a cash card unnoticed by the card holder. For example, it is thinkable, that with the help of a mobile terminal for contactless cards, which is moved through crowds of people (e.g. fairs, concerts, underground, train station . . . ), "electronic" money is unnoticedly debited from the wallets located in the vicinity. With contact-type cards such a problem does not occur, since a payment transaction is effected by the card holder by inserting the card into the card reader.

Beside the use as a means of payment contactless cards likewise can be employed as data carriers in documents of value, such as e.g. passports. In particular, it is expedient to use contactless cards as visa, which can be incorporated, for example bonded, into the passport document. For this purpose e.g. the coil-on-chip method (CoC) is suitable, with which the antenna is disposed on the chip. But conventional contactless arrangements can be used likewise, such as e.g. foils with chip disposed thereon and a coil printed onto the foil.

When using contactless cards in documents of value, the problem arises, that an unintended reading by third parties is to be prevented. The same applies to the unauthorized and unnoticed readout of contactless transponders, which are employed for product identification.

Therefore, it is the problem of the present invention to provide an apparatus as well as a method for reliably determining the deliberate use of a contactless data carrier by the card holder.

SUMMARY OF THE INVENTION

With the help of the additional data transmission channel by optical means data are exchanged between reading device and data carrier, which are suitable to perform an authentication between reading device and contactless card. The authentication via the additional data transmission channel prevents an unintentional actuation of the contactless card, since the optical information is not available, when the data carrier is not optically visible to the reading device, for instance is carried in a bag/purse.

According to a first embodiment of the invention the data carrier has optically readable information, such as e.g. a bar code or matrix code. When the card is presented to the reading device, this information is read and evaluated by means of an optical reading device, e.g. a bar code scanner. The optically read information then can be used by the contactless data carrier for authenticating purposes between itself and the contactless reading device, in order to in such a way furnish the authorization for a subsequent transaction.

An enhancement of this first embodiment is to output the optically shown information onto a display device, e.g. a LCD display, by means of the chip. As a result of this, simply copying the information is no longer possible, since the information may contain randomly generated data structures.

According to a further embodiment of the invention the contactless data carrier is equipped with an optical illuminant, e.g. an IR light emitting diode or a light emitting foil. The illuminant can have an electrical connection to the chip or can be integral part of the chip. As soon as a contactless reading device intends to perform a transaction with the data carrier, the illuminant is used for sending additional data from the chip to the reading device by optical means. These data can be part of a mutual authentication and are used according to the invention for releasing a subsequent transaction. When the reading device does not have knowledge of the optically transmitted data, a transaction with the data carrier cannot be carried out.

Preferably, changes of the environmental conditions can be detected on the data carrier, as soon as the data carrier is removed from the bag for a payment transaction. For example, by means of a light-sensitive optical component (14) can be determined, whether the card is located inside a bag or outside. The light-sensitive component can have an electrical connection to the chip or be integral part of the chip. As soon as the light-sensitive component is exposed to a minimum of brightness, according to the invention a release signal is produced, which permits a transaction between the chip and the contactless reading device.

The advantage of this variant is that special contactless terminals are not required, and the already existing infrastructure (e.g. contactless terminals, as they are already used in closed systems, such as a canteen) can still be used.

A development of this idea provides that the reading device itself produces an optical signal. For releasing a transaction by means of the chip it is thinkable to provide the optical signal with a striking modulation, e.g. a 1-kilohertz-signal, or to transmit data to the chip by means of the optical signal, this data being used for an authentication between data carrier and reading device.

A combination of the above-mentioned embodiments consists of providing both an optical illuminant and an optical receiving means on the card and to connect them to the chip or to provide these means as integral parts of the chip. In this case beside a contactless bi-directional data transmission additionally a bi-directional optical data transmission between the card and a reading device would be practicable. According to the invention it is provided to switch between the different transmission channels, preferably each transmission channel can be used at least one time for the transmission of data.

A further advantage of this arrangement is that the energy for operating the optical means of communication is obtained from the contactless transmission channel (e.g. magnetic or capacitive coupling). Furthermore, it is understood, that for the optical communication beside visible light also IR, UV or a mixture (uplink vs. downlink) from these areas can be used.

Analogously to optical information, alternatively or additionally, acoustic information may be used, e.g. in the form of transmitting an encoded acoustic signal, which e.g. can be produced by means of a loudspeaker integrated in the card (e.g. piezo loudspeaker).

Furthermore, a loudspeaker located in the card is suitable for acknowledging each payment transaction with a signal, which indicates to the card holder that in this moment a payment transaction takes place on his card. In this embodiment of the invention though it would still be possible to illegally debit money from the card with a mobile contactless terminal, such a transaction would not remain unnoticed.

Instead of a loudspeaker, alternatively or additionally, there can be provided to equip the data carrier with a vibration alarm.

DESCRIPTION OF THE DRAWING

In the following the invention is explained in detail with reference to the embodiments represented in the figure.

DETAILED DESCRIPTION OF THE PREFERRED EMBODIMENTS OF THE INVENTION

Figure 1:
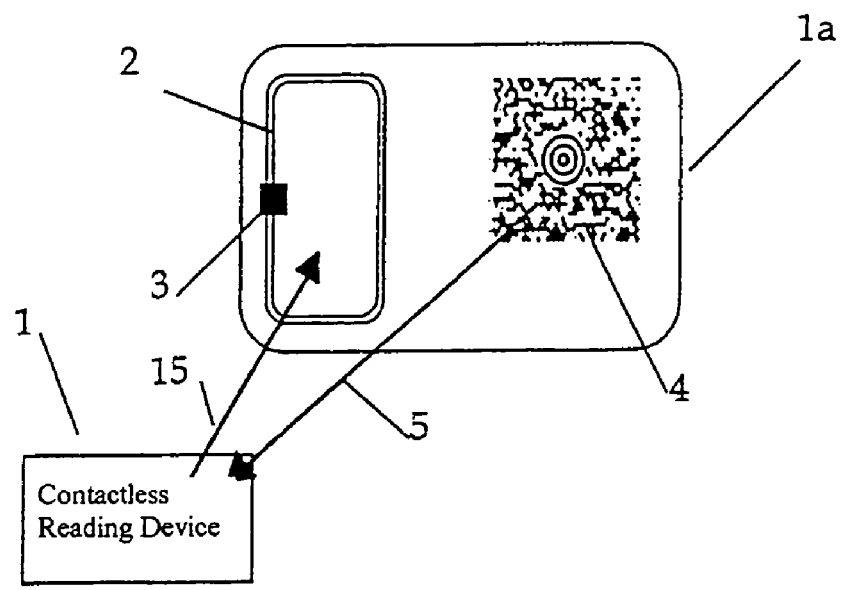
FIG. 1 shows an embodiment of the present invention, wherein onto the data carrier is applied an optical information.

FIG. 1 shows a contactless data carrier 1a, with an antenna 2 disposed thereon and a chip 3 electro-conductively connected with it. An area of the data carrier has optical information 4, for example a bar code or a matrix code, which is suitable for being transmitted to the reading device 1 via an optical data transmission channel 5. The optical data transmission channel 5 is provided additionally to the antenna-based contactless data transmission channel 15.

Figure 2:
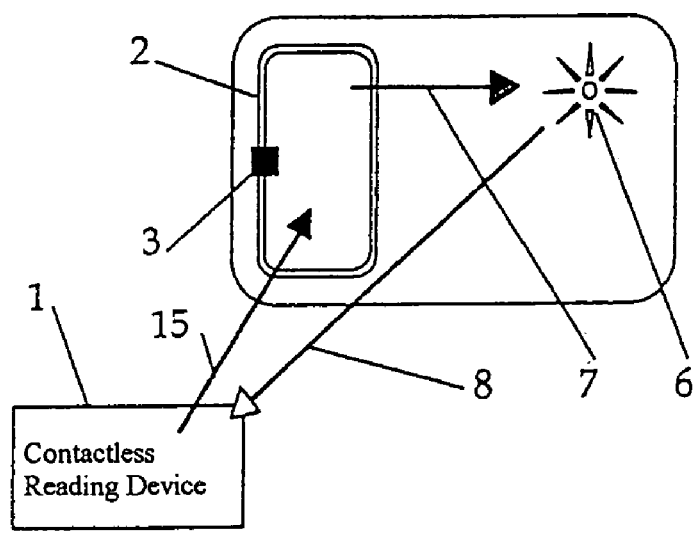
FIG. 2 shows a further embodiment of the invention with an illuminant disposed on the data carrier.

FIG. 2 describes a contactless data carrier, on which an optical illuminant 6 is disposed. The illuminant 6, which can be designed as a LED, OLED or also as an infrared light emitting diode (IR-LED), is electro-conductively connected, as indicated by the arrow 7, to the chip 3 and is activated by it. Here an optical data transmission is effected via the data transmission channel 8.

Figure 3:
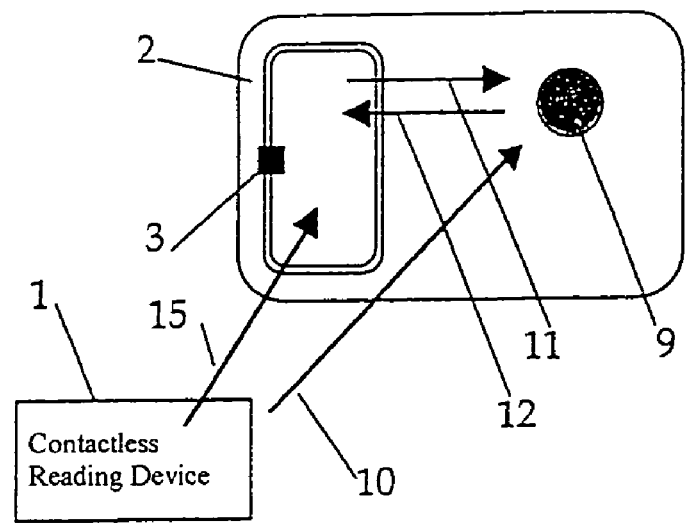
FIG. 3 shows a further embodiment of the invention with an optical receiving means disposed on the data carrier.

A further embodiment is shown in FIG. 3, wherein on the data carrier 1a is disposed an optical receiving means 9, which is electro-conductively connected to the chip 3 and enables a bi-directional optical data transmission between reading device 1 and data carrier 1a. The chip 3 is adapted to control the data transmission for both the contactless data transmission 15 and the optical data transmission 10. The two transmission channels can be operated alternately or simultaneously. Furthermore, the transmission channels can be operated in a flat or hierarchical (master-slave) fashion.

Figure 4:
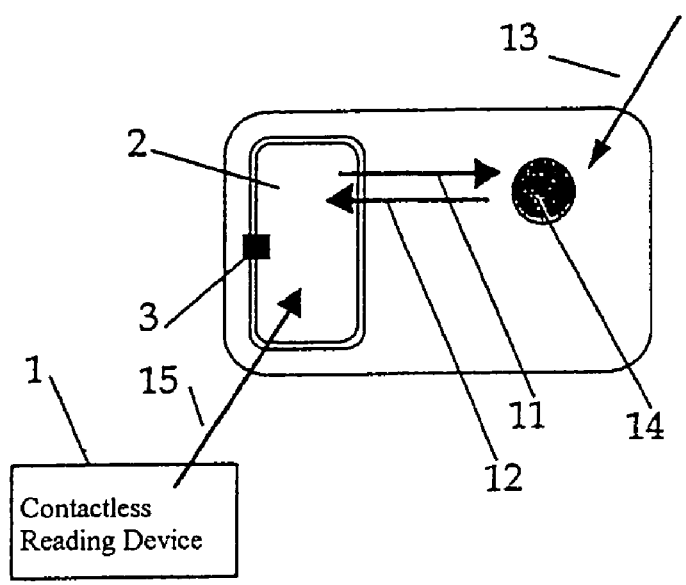
FIG. 4 shows a further embodiment of the invention with an optical component disposed on the data carrier.

With the help of the optical component 14 represented in FIG. 4, which has an electro-conductive connection 11 to the chip 3, with sufficient incidence of light 13 the data transmission via the antenna-based contactless interface can be released (indicated by the arrow 12).

Figure 5:
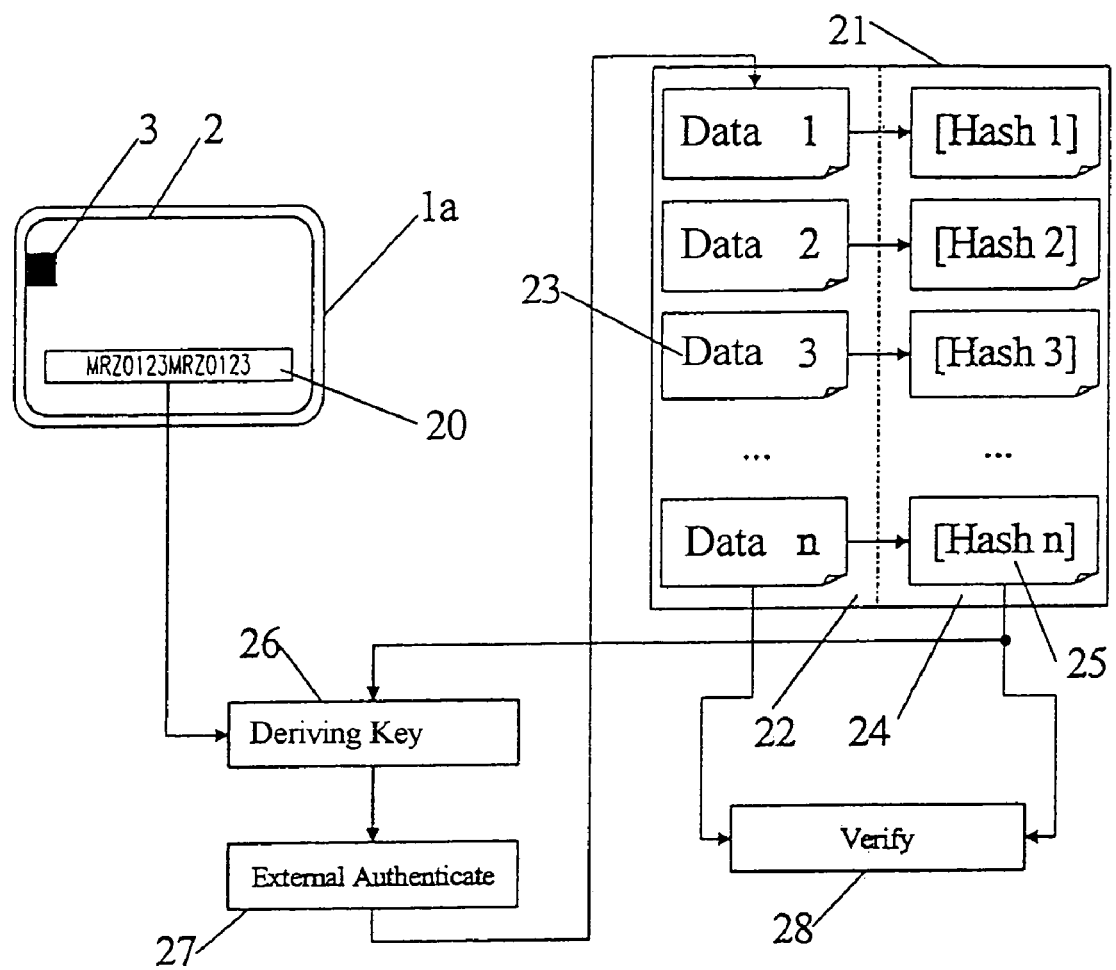
FIG. 5 shows an embodiment of a method for deriving a cryptographic key.

The method for releasing secret information stored in the data carrier 1a can be executed for example as follows. As represented in FIG. 5, the storage device 21 of the chip 3 has a plurality of storage areas 24 or 22, which partially are freely readable and the contents of which partially are protected against an unauthorized readout by means of suitable keys. The protected storage area 22 contains at least one data record 23, which consists of information to be kept secret, such as e.g. biometric data, PIN etc. The freely readable storage area 24 contains at least one data record 25, which is unequivocally allocated to the respective data record 23 and represents a compression value, e.g. a CRC, hash, a cryptographic check sum etc. A conclusion drawn from the content of the freely readable data record 25 about the content of the secret data record 23 is impossible.

For reading out one of the data records 23 according to the invention it is provided, that in a first procedure step the data record 25 allocated to the data record 23 is read out via the antenna-based data transmission channel 15 and the optically readable information 20 of the data carrier 1a, e.g. a bar code or a MRZ (machine readable zone) is read out with the aid of the reading device 1.

In a second procedure step from the data record 25 and the optically readable information 20 a cryptographic key 26 is derived. For this purpose any key derivation methods can be employed, which are sufficiently well-known from the prior art, such as e.g. key derivation using a master key etc. The cryptographic key individual for the data carrier, which has been derived from the secret master key, is already stored on the data carrier. The master key is deposited in the reading device for deriving the cryptographic key 26 by means of the optically read information 20 and the contactlessly read data record 25.

A third procedure step provides to perform an authentication 27 between reading device 1 and the chip 3 of the data carrier 1a by means of the derived cryptographic key. By this means it is verified, whether the respective keys known to the reading device 1 or stored in the data carrier 1a are identical. An authentication method already known from prior art works according to the "challenge-response principle", which is widely used in the field of chip cards. By a "get-challenge" command the reading device 1 receives a random number from the chip 3, so as to then authenticate itself to the chip by the data of an "external authenticate" command, which are derived from the random number and the key. It is obvious that further authentication steps, for example for the mutual authentication, and other methods for authentication can be used.

In a simplified method in the third procedure step the reading device which uses the two data transmission channels shall merely authenticate itself as such, without simultaneously proving the knowledge of a secret key. In the second procedure step 26 for example then a value is derived, which though it is used as a key for the third step 27, it is not secret or derived from a master key.

In an optionally last procedure step from the read-out data record 23 a compression value is formed and this compression value is compared to the content of the freely readable data record 25 (cf. FIG. 5, verify 28). If the two compression values differ from each other, then it is to be assumed, that the data record 23 has been unauthorizedly changed. After a successful authentication the data record 23 can be read out.

Figure 6:
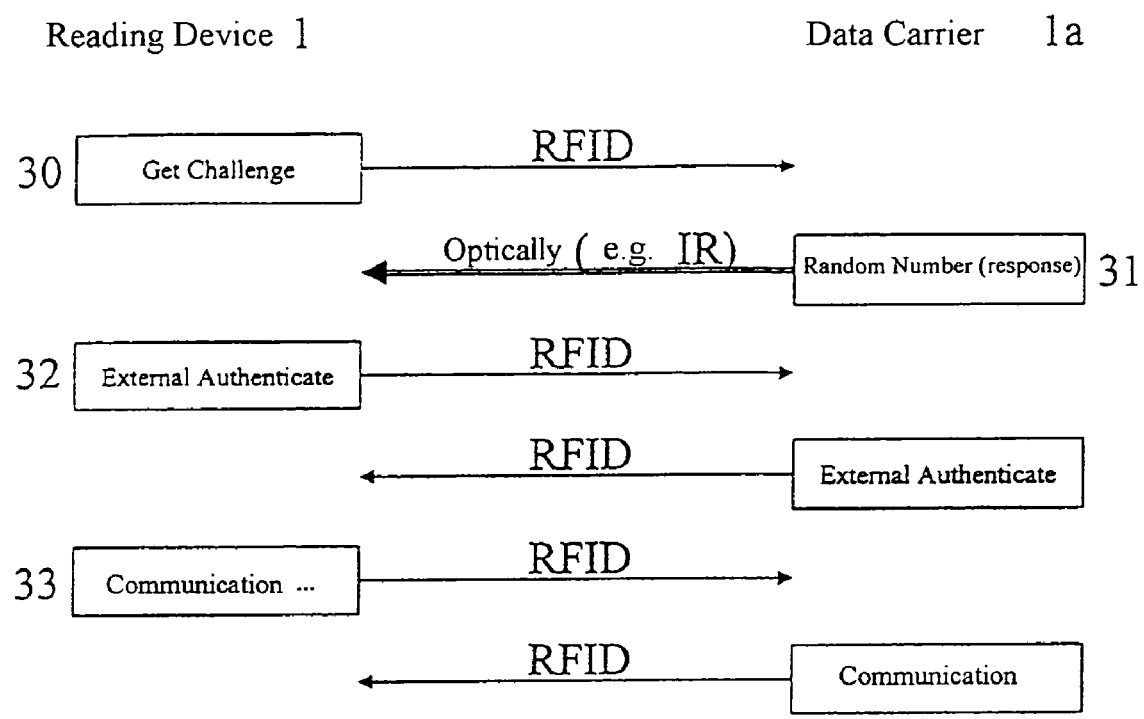
FIG. 6 shows an embodiment of an authentication method.

The method described in FIG. 6 likewise provides that at least for a part of the data stored in the transponder the access is permitted only upon successful authentication. This method, too, works according to the "challenge-response principle".

In a first step 30 the reading device 1 requests a random number from the data carrier 1a via the antenna-based transmission channel 15. In an embodiment according to the invention a random number generated by the data carrier 1a is transmitted via the optical data transmission channel 5, for example a (infrared-/UV-) LED, to the reading device 1 (step 31: "response"). A further possibility is to output the random number in the form of a bar code, pixel code, MRZ (machine readable zone) onto a display 4 on the contactless data carrier 1a. Simultaneously a response can be sent via the antenna-based data transmission channel 15, which differs in content from the contactless data transmitted by optical means, but avoids a time-out in the transmission channel, i.e. in particular at the reading device. On the one hand a potential attacker cannot draw any conclusions as to content when eavesdropping on the antenna-based transmission channel 15, and on the other hand a special treatment of individual application commands is not required, so that the software of the reading device 1 has not to be modified. For example, it is expedient to send the code "90 00" (command successfully carried out). In order to mislead possible attackers also wrong data can be transmitted.

Likewise, it is possible to request the random number via the optical data transmission channel and to transmit it via the antenna-based data transmission channel.

Then the authentication algorithm is executed according to the known method for the one-sided or mutual authentication ("external authenthicate", 32). After the successful completion of the authentication process, the actual communication 33 can be started and the data record 23 is read out.

The method described with respect to FIG. 6 can be used in combination with or independently of the method described in FIG. 5.

An advantage of the described method is that by using two different data transmission channels—namely the optical 5 and the antenna-based 15—a tampering with or replacement of the data is made significantly more difficult. Therefore, it is especially suitable for the exchange of sensible data, such as e.g. personal data. A one-sided authentication or a mutual authentication are improved by the combined use of the two data transmission channels.

Depending on the type of data to be transmitted it is also possible to selectively use only one data transmission channel. The loss of security connected therewith normally is coupled with an increase of processing speed and may be tolerated with data as needed for example for the fields of logistics, transport of goods and merchandise management. If with the same data carrier 1a also sensible data are to be processed, there can be mandatory provided to use the two data transmission channels when reading out by means of the reading device. The switching between one- or two-transmission-channel modus can be effected automatically after having set a flag or the like.

A reading device 1 according to the invention is an intelligent device, which is equipped with both antenna-based contactless reading means 2 and optical reading means. In a preferred embodiment the reading device 1 is formed as a mobile terminal, e.g. mobile phone, PDA, laptop or the like and has an interface for contactless communication, such as NFC (near field communication). As an optical means of communication the IRDA interface present in most of the devices can be used. As an optical reading means a camera can be provided. Preferably, the optically readable data, such as e.g. the serial number of the chip 3 on the data carrier 1a are represented in a machine readable form (bar code, OCR data). Such a reading device 1 is especially suitable for checking travel documents by police or border police, and via a possibly additionally existing online connection further information can be requested.

For increasing the security there can be provided, that the chip 3 of the data carrier 1a additionally generates a random number serving as a serial number and that it transmits this number via the antenna-based data transmission channel to the reading device 1. The use of such random serial numbers is described, for example, in ISO 14443 (Chapter 6.6.4, "UID contents and cascade levels"). The serial number of the data carrier 1a required for carrying out the anticollision algorithm here is not formed by an unequivocal and unmistakable number, as it is usual, but by a random number freshly produced for each transaction. By this measure a conclusion drawn from the serial number about the identity of the data carrier is not possible. A possible (replay-) attack by repeating a once eavesdropped communication between data carrier and terminal can be prevented especially effective by this means.

Likewise, the optically readable data can be available on the data carrier 1a in a non-static fashion and be dynamically modified e.g. with the aid of a display or the like. In such a way also single-use passwords, random serial numbers etc. can be generated and displayed. Furthermore, any combination of the dynamically generated data and either antenna-based or optically transmitted data is thinkable.

According to the present invention a contactless data carrier has an antenna and a chip, the data carrier having means for the transmission of data via an optical data transmission channel and means for the transmission of data via an antenna-based data transmission channel. On the data carrier are disposed data, which via the optical data transmission channel and/or the antenna-based data transmission channel are transmittable to a reading device.

The invention claimed is:

1. A contactless data carrier with an antenna and a chip, comprising a data carrier on which are disposed data which are transmittable to a reading device via an optical data transmission channel, and on which are disposed data which are transmittable to a reading device via an antenna-based data transmission channel, wherein the chip has storage areas, including at least one storage area that is freely readable and at least one storage area that is only readable after an authentication of the data carrier and the reading device, wherein the storage area that is only readable after an authentication of the data carrier, and the reading device, has at least one first data record, and the freely readable storage area has at least one second data record, which is clearly allocated to the first data record and is derivable from the first data record.

2. The data carrier according to claim 1, wherein the stored data records are stored as data records encrypted with a cryptographic key.

3. The data carrier according to claim 1, wherein the second data record forms a compression value of the first data record.

4. The data carrier according to claim 1, wherein a light-sensitive component is disposed on the data carrier and controls the function of the chip in dependence on the brightness.

5. The data carrier according to claim 1, wherein optically readable information is applied onto the data carrier.

6. The data carrier according to claim 5, wherein a matrix code is applied onto the data carrier.

7. The data carrier according to claim 5, wherein a bar code is applied onto the data carrier.

8. The data carrier according to claim 1, wherein a display for representing optical data is disposed on the data carrier.

9. The data carrier according to claim 1, wherein an illuminant for sending optical signals is disposed on the data carrier.

10. The data carrier according to claim 1, wherein an optical receiving means for receiving optical signals is disposed on the data carrier.

11. The data carrier according to claim 1, wherein a loudspeaker is disposed on the data carrier.

12. The data carrier according to claim 1, wherein a vibration detector is disposed on the data carrier.

13. The data carrier according to claim 1, wherein an authentication requires the use of the two data transmission channels.

14. A method for reliably determining the deliberate use of a contactless data carrier, comprising, in dependence on the data to be exchanged between the data carrier and a reading device, in addition to an antenna-based contactless data transmission, effecting an optical data transmission with the help of data disposed on the data carrier, wherein for a readout of a first data record, in a first step the reading device reads out a second data record, which is allocated to the first data record, and data optically represented on the data carrier.

15. The method according to claim 14, comprising effecting the data transmission in a bi-directional fashion.

16. The method according to claim 14, comprising selectively switching between the optical and the antenna-based data transmission.

17. The method according to claim 14 including effecting at least a one-sided authentication between the reading device and the data carrier.

18. The method according to claim 17, wherein the authentication is effected by the optical data transmission.

19. The method according to claim 17, wherein the authentication is effected in such a way that it requires the use of both contactless antenna-based data transmission and optical data transmission that together define two data transmission channels.

20. The method according to claim 19, wherein a random number is requested via one of the two data transmission channels, either the optical or the antenna-based data transmission channel, and is transmitted via the respective other data transmission channel.

21. The method according to claim 17, wherein the authentication is carried out in the manner of a challenge-response method.

22. The method according to claim 14, wherein in a second step, the reading device forms a value derived from the read-out data and a secret key;

in a third step, on the basis of the derived value, the authentication between the reading device and the data carrier is effected; and in a fourth step, the first data record is read out by the reading device.

23. The method according to claim 22, wherein in a fifth step, from the first data record a compression value is formed, and in a further procedure step a comparison is effected between the such formed compression value and the second data record.

24. A reading device for reading a contactless data carrier, comprising means for reading optical data and being configured that, for a readout of a first data record contained in a protected storage area of the data carrier, the reading device first reads out a second data record contained in a freely readable storage area of the data carrier and data optically represented on the data carrier.

25. The reading device according to claim 24, comprising means for sending an optical signal.

26. The reading device according to claim 25, comprising means for modulating the optical signal.

27. The reading device according to claim 25, comprising an infrared interface.

28. The reading device according to claim 24, wherein the device is formed as a mobile terminal.

29. The reading device according to claim 24, wherein the device has an interface for the near field communication.

30. The reading device according to claim 24, wherein the device is adapted to read a contactless data carrier according to claim 1.

* * * * *

(12) EX PARTE REEXAMINATION CERTIFICATE (8995th)
United States Patent
Graf et al.

(10) Number: US 7,837,119 C1
(45) Certificate Issued: May 1, 2012

(54) CONTACTLESS DATA CARRIER

(75) Inventors: Hans Graf, Rosenheim (DE); Klaus Finkenzeller, Unterföhring (DE); Alfred Rossmadl, Boos (DE)

(73) Assignee: Giesecke & Devrient GmbH, Munich (DE)

Reexamination Request:
No. 90/011,587, Mar. 21, 2011

Reexamination Certificate for:
Patent No.: 7,837,119
Issued: Nov. 23, 2010
Appl. No.: 10/552,626
Filed: Sep. 12, 2006

(22) PCT Filed: Apr. 13, 2004
(86) PCT No.: PCT/EP2004/003880
§ 371 (c)(1),
(2), (4) Date: Sep. 12, 2006
(87) PCT Pub. No.: WO2004/090800
PCT Pub. Date: Oct. 21, 2004

(30) Foreign Application Priority Data
Apr. 14, 2003 (DE) .......................... 103 17 257

(51) Int. Cl.
*G06K 19/06* (2006.01)

(52) U.S. Cl. .......................... 235/492; 235/440; 235/454
(58) Field of Classification Search ........................ None
See application file for complete search history.

(56) References Cited

To view the complete listing of prior art documents cited during the proceeding for Reexamination Control Number 90/011,587, please refer to the USPTO's public Patent Application Information Retrieval (PAIR) system under the Display References tab.

*Primary Examiner* — Cameron Saadat

(57) ABSTRACT

The invention relates to an apparatus as well as a method for reliably determining the deliberate use of a contactless data carrier. Beside an antenna-based data transmission channel in dependence on the data to be transmitted additionally an optical data transmission channel between reading device and data carrier can be employed.

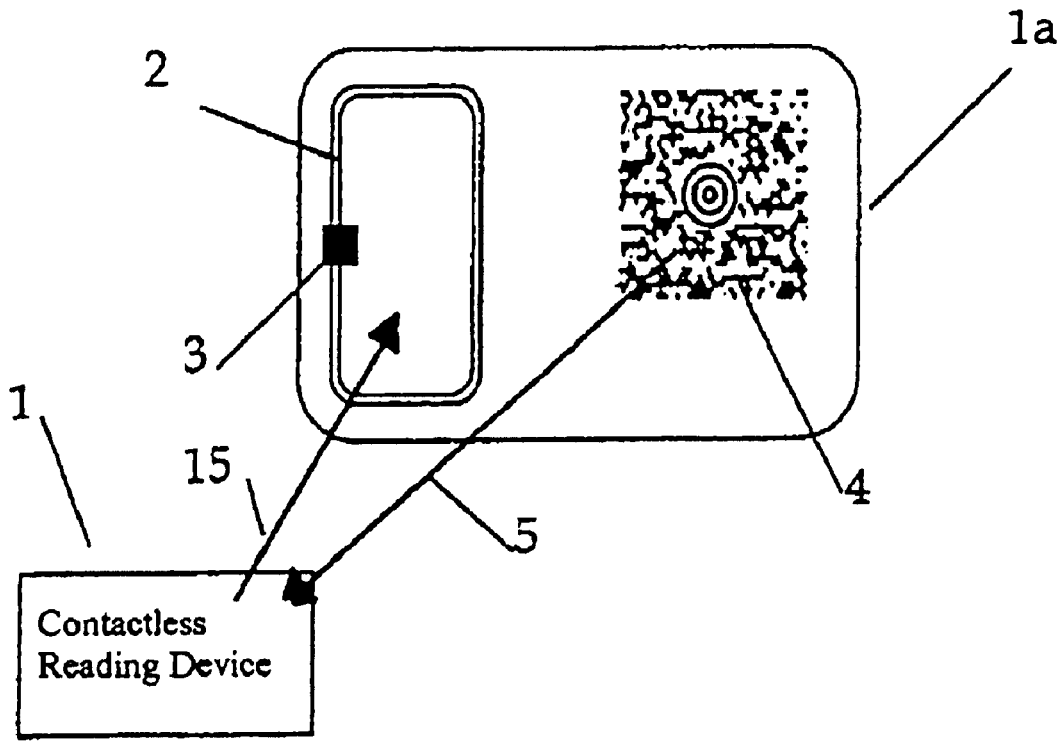

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 13 and 17-19 are cancelled.

Claims 1, 14, 20-21, 24 and 29 are determined to be patentable as amended.

Claims 2-12, 15-16, 22-23, 25-28 and 30 dependent on an amended claim, are determined to be patentable.

1. A contactless data carrier with an antenna and a chip, comprising a data carrier on which are disposed data which are transmittable to a reading device via an optical data transmission channel, and on which are disposed data which are transmittable to a reading device via an antenna-based data transmission channel,
 wherein the chip has storage areas, including at least one storage area that is freely readable and at least one storage area that is only readable after an authentication of the data carrier and the reading device,
 wherein the storage area that is only readable after an authentication of the data carrier, and the reading device, has at least one first data record, and the freely readable storage area has at least one second data record, which is clearly allocated to the first data record and is derivable from the first data record,
 *wherein an authentication requires the use of the two data transmission channels.*

14. A method for reliably determining the deliberate use of a contactless data carrier, comprising, in dependence on the data to be exchanged between the data carrier and a reading device, in addition to an antenna-based contactless data transmission, effecting an optical data transmission with the help of data disposed on the data carrier,
 wherein for a readout of a first data record, in a first step the reading device reads out a second data record, which is allocated to the first data record, and data optically represented on the data carrier, *and*
 *effecting at least a one-sided authentication between the reading device and the data carrier,*
 *wherein the authentication is effected in such a way that it requires the use of both contactless antenna-based data transmission and optical data transmission that together define two data transmission channels.*

20. The method according to claim [19] *14*, wherein a random number is requested via one of the two data transmission channels, either the optical or the antenna-based data transmission channel, and is transmitted via the respective other data transmission channel.

21. The method according to claim [17] *14*, wherein the authentication is carried out in the manner of a challenge-response method.

24. A reading device for reading a contactless data carrier, comprising means for reading optical data and *an antenna-based contactless reading interface, the reading device being configured that,* for a readout of a first data record contained in a protected storage area of the data carrier, the reading device first reads out a second data record contained in a freely readable storage area of the data carrier and data optically represented on the data carrier, *wherein the reading device is configured to authenticate the contactless data carrier using two data transmission channels defined by a contactless antenna-based transmission and an optical data transmission.*

29. The reading device according to claim 24, wherein the [device has an interface] *contactless reading interface is configured* for [the] near field communication.

* * * * *